(12) United States Patent
Lesellier (10) Patent No.: US 8,948,516 B2
(45) Date of Patent: Feb. 3, 2015

(54) METHOD FOR REGENERATING THE BACKGROUND OF DIGITAL IMAGES OF A VIDEO STREAM

(75) Inventor: Estelle Lesellier, Meudon (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 341 days.

(21) Appl. No.: 13/518,369

(22) PCT Filed: Dec. 17, 2010

(86) PCT No.: PCT/EP2010/070060
§ 371 (c)(1),
(2), (4) Date: Jul. 18, 2012

(87) PCT Pub. No.: WO2011/076682
PCT Pub. Date: Jun. 30, 2011

(65) Prior Publication Data
US 2012/0275706 A1    Nov. 1, 2012

(30) Foreign Application Priority Data
Dec. 21, 2009  (FR) ...................................... 09 59324

(51) Int. Cl.
*G06K 9/00* (2006.01)
*G06T 7/20* (2006.01)
*H04N 19/23* (2014.01)

(52) U.S. Cl.
CPC ............ *G06T 7/2053* (2013.01); *H04N 19/004* (2013.01); *G06T 7/2013* (2013.01); *G06T 2207/10016* (2013.01); *G06T 2207/20021* (2013.01); *G06T 2207/20144* (2013.01); *G06T 2207/30232* (2013.01)

USPC .......................................... 382/195; 382/173

(58) Field of Classification Search
None
See application file for complete search history.

(56) References Cited

U.S. PATENT DOCUMENTS 6,870,945 B2 *  3/2005  Schoepflin et al. ............ 382/103
7,130,464 B2 * 10/2006  Kondo et al. .................. 382/190

FOREIGN PATENT DOCUMENTS

WO       2005122094 A1    12/2005

OTHER PUBLICATIONS

Mukawa et al. (Nov. 1985) "Uncovered background prediction in interframe coding." IEEE Trans. on Communications, vol. Com-33 No. 11, pp. 1227-1231.*

(Continued)

*Primary Examiner* — Barry Drennan
(74) *Attorney, Agent, or Firm* — Coats & Bennett, PLLC (57) ABSTRACT

The invention relates to a method for regenerating the background of digital images of a video stream comprising steps consisting in: —setting an initial background image, —cutting the unit images of the video stream into blocks b (i, j, t) and of the background image into corresponding blocks Bo (i, j, t). The method is essentially characterized in that it further includes steps consisting in: —selecting one block Bo of the background image and/or b of the frame image, and •calculating the space correlation thereof, with: •at least one block Bo of the background image at a time (t), and/or at another time (t−a), and/or •at least one block b of the frame image at a time (t), and/or at another time (t−a), and/or—updating the background image according to the calculation of the space correlation.

11 Claims, 4 Drawing Sheets

(56) References Cited

OTHER PUBLICATIONS

Chien et al. (Jul. 2002) "Efficient moving object segmentation algorithm using background registration technique." IEEE Trans. on Circuits and Systems for Video Technology, vol. 12 No. 7, pp. 577-586.*

Vikas Reddy et al., "An Efficient Background Estimation Algorithm for Embedded Smart Cameras", Distributed Smart Cameras, 2009 ICDSC 2009. Third ACM /IEEE International Conference on, IEEE, Piscataway, NJ, USA; Aug. 2009, pp. 1-7, XP031548049.

Seki M. et al., "Background Subtraction Based on Cooccurrence of Image Vibrations", Proceedings/2003 IEEE Computer Society Conference on Computer Vision and Pattern Recognition, pp. 18-20, Jun. 2003, Madison, WI; (Proceedings of the IEEE Computer Conference on Computer Vision and Pattern Recognition), Los Alamitos, CA; vol. 2; Jun. 18, 2003 pp. 65-72, XP010644589.

Taeho, Kim et al., "Robust Background Acquisition from Dynamic Scene Caused by a Moving Camera", Information Acquisition, 2007, ICIA '07 International Conference on IEEE, PI, Jul. 1, 2007, pp. 304-309, XP031130223.

\* cited by examiner

METHOD FOR REGENERATING THE BACKGROUND OF DIGITAL IMAGES OF A VIDEO STREAM

This application claims priority of International Patent Application No. PCT/EP2010/070060, filed Dec. 17, 2010, which claims priority to FR0959324, filed Dec. 21, 2009.

The present invention relates to the field of the automatic processing of digital images, more particularly for retrieving a stationary background or a static image, from a plurality of frames.

Frames are captured by a video camera or a picture camera, possibly integrated in a communicating object (telephone, PDA, etc.), hereinafter known by the generic word "camera".

It is assumed that the camera is stationary, that the scene shot has at least one stationary background, for example corresponding to a stationary subject (an object, a building, a character, etc. . . . ), and preferably, that light is substantially identical when the pictures are taken. Objects which are moving with respect to such a stationary background are designated as the foreground.

Methods for regenerating the background of digital images of a video stream produced by a fixed camera and including a plurality of time-sequential unit images are known and enable, for example, to follow-up moving objects for safety applications, or the digital editing, either for down-breaking the movement, or for the elimination of undesirable moving subjects in the foreground.

However, such methods generally require the capture of an interference-free background image in the foreground, refer for example to the document US 2003/0194131, which is not always possible.

In addition, most of such processes are exclusively based on time correlations, which means that they have processing defects, more particularly when the scene includes a partially stationary object in the foreground. As a matter of fact, the stationary part of the object is then considered as being integral with the background, which pollutes the regenerated background image.

The present invention aims at improving the existing techniques.

For this purpose, the invention relates, as per the first of its objects, to a method for regenerating the background of digital images of a video stream produced by a fixed camera and including a plurality of time-sequential frames, with each one including a respective unit image, the method comprising steps consisting in:
setting an initial background image in a memory,
cutting the unit images of the video stream into blocks (i, j, t) of at least one pixel, and
cutting the background image into corresponding blocks $Bo(i, j, t)$ having the same size and the same coordinates (i, j) as those of the unit images.

According to the invention, the method is essentially characterized in that it further includes steps consisting in:
selecting at least one block $b(i, j, t)$, $b(i, j, t-a)$, $Bo(i, j, t-a)$, and $Bo(i, j, t)$, and
calculating the space correlation thereof, with the space correlation consisting in computing:
the space correlation (Corr_spat_mes_b, Corr_spat_mes_b_Bo) between a given block $b(i, j, t)$ of the frame image, at a time (t), and
at least one block $Bo(i\pm x*\delta i, j\pm y*\delta j, t)$ of the background image close to said block $Bo(i, j, t)$, at a time (t), and/or
at least one block $Bo(i\pm x*\delta i, j\pm y*\delta j, t-a)$ of the background image close to said block $Bo(i, j, t-a)$, at another time (t−a), and/or
at least one block $b(i\pm x*\delta i, j\pm y*\delta j, t)$ of the frame image close to said block $b(i, j, t)$, at a time (t), and/or the space correlation (Corr_spat_mes_Bo, Corr_spat_mes_Bo_b) between a given block $Bo(i, j, t)$ of the background image, at a time (t), and
at least one block $Bo(i\pm x*\delta i, j\pm y*\delta j, t)$ of the background image close to said block $Bo(i, j, t)$, at a time (t), and/or
at least one block $Bo(i\pm x*\delta i, j\pm y*\delta j, t-a)$ of the background image close to said block $Bo(i, j, t-a)$, at another time (t−a), and/or
at least one block $b(i\pm x*\delta i, j\pm y*\delta j, t)$ of the frame image close to said block $b(i, j, t)$, at a time (t), and
updating the background image according to the calculation of the space correlation.

Thus, the proposed solution searches background block considering a mixed temporal and spatial pixel value correlation criterion: a background pixel block is updated if its pixel values are very similar (temporally correlated) to collocated previous pixel blocks in a past scanned sequence frames but also if they are highly similar (spatially correlated) to neighbor pixels blocks in the background map.

Preferably, the updating of the background image includes a step consisting in substituting the block $b(i, j, t)$, $b(i, j, t-a)$, $Bo(i, j, t-a)$ or $Bo(i, j, t)$ for the block $Bo(i, j, t)$ by selecting among these the one having the minimum space correlation.

Preferably, the space correlation is calculated by measuring the sum of the absolute differences (SAD) between the blocks considered, thus the invention considers a spatial correlation working in the pixel domain based on SAD.

In one embodiment, the space correlation between a given block $((b(i, j, t), Bo(i, j, t))$ and a set of blocks $(b(i\pm x*\delta i, j\pm y*\delta j, t), Bo(i\pm x*\delta i, j\pm y*\delta j, t))$, with $\{x, y\} \in \{1; 2; \ldots; \Delta\}^2$ is set along specific directions,
with the minimum value of the sums of the absolute differences (SAD) along each one of these specific directions being retained as a measure of the space correlation.

In one embodiment, the method further comprises steps consisting in:
calculating the time correlation (Corr_temp_mes_b) between a given block $b(i, j, t)$ of an image at a time (t) and the same block $b(i, j, t-a)$ of one image or of several images at a preceding time (t−a), and/or
calculating the time correlation (Corr_temp_mes_Bo) between a given block $Bo(i, j, t)$ of an image at a time (t) and the same block $Bo(i, j, t-a)$ of one image or of several images at a preceding time (t−a), and
updating the background image also according to the time correlation.

In one embodiment, the space correlation coupled to a measure of the time correlation is measured (sum1) on at least two frames, where the weight of the space correlation is weighted by a parameter λ depending on time λ(t), so that Sum1=Corr_temp_mes_$b(i,j,t)$+λ$(t)$·Corr_spat_mes_$b$_$Bo(i:i\pm x*\delta i,j:j\pm y*\delta j,t:t)$, the space correlation coupled to a measure of the time correlation is measured (sum2) on at least two frames, where the weight of the space correlation is weighted by a parameter λ depending on time λ(t), so that Sum2=Corr_temp_mes_$Bo(i,j,t)$+λ$(t)$·Corr_spat_mes_$Bo(i:i\pm x*\delta i,j:j\pm y*\delta j,t-a:t)$, and
the value of the block $Bo(i, j, t)$ is updated by selecting the minimum value of both values (Sum1, Sum2).

In one embodiment, each frame of blocks $b(i, j)$ or background image of blocks $(Bo(i, j)$ is scanned at least in a first and in a second direction, so that a first series of correlation computations is performed in the first direction; and a second series of correlation computations is performed in the second direction.

For example, the size of the blocks b(i, j) or Bo(i, j) in the first direction is different from that of the blocks b(i, j) or Bo(i, j) in the second direction.

In one embodiment, the method according to the invention previously further comprises a step consisting in computing the sum of measures of stationarity for the set of the blocks b(i, j, t) of a frame at a time (t) and
- comparing the sum of the measures of stationarity with a first threshold (T1), and
- if the sum is under the first threshold (T1), then the frame is not taken into account for the space correlation computations; and/or
- comparing the sum of the measures of stationarity with a second threshold (T2), and
- if the sum is above the second threshold (T2), then the frame is not taken into account for the space correlation computations.

In one embodiment, the method according to the invention further comprises steps consisting in:
- calculating the speed of convergence of the background image,
- comparing the calculated speed with a threshold, and
- stopping the scanning of the blocks Bo(i, j) of the background image if the speed is under the threshold.

According to another one of the objects, the invention also relates to a computer programme, including programme code instructions for the execution of the steps of the method defined hereabove, when said programme is executed by a computer.

Thanks to the invention, the background image is updated on the fly, which makes it available and thus displayable at any time, which improves the latency as compared to the techniques of the prior art, which require all the frames. Similarly, thanks to the progressive construction of the background image thereof, the invention makes it possible to optimise the memory resources; whereas the prior art requires to store the whole video.

Another advantage relies on that the proposed solution is a single-map background reconstruction: it only stores in memory one background image, whose pixel blocks are updated along the sequence frames scan.

It also starts the background reconstruction process with a background map possibly containing error background elements (which will be updated during the background block research), and being thus entirely filled.

Other characteristics and advantages of the present invention will appear more clearly upon reading the following description which is given as an illustrative and not a limitative example, and referring to the appended drawings, wherein.

According to the present invention, it is assumed that the camera is fixed for the duration of the exposition.

A first step consists in capturing a plurality of time-sequential unit images of a scene.

Another step consists in setting an initial background image.

Figures 1, 2:
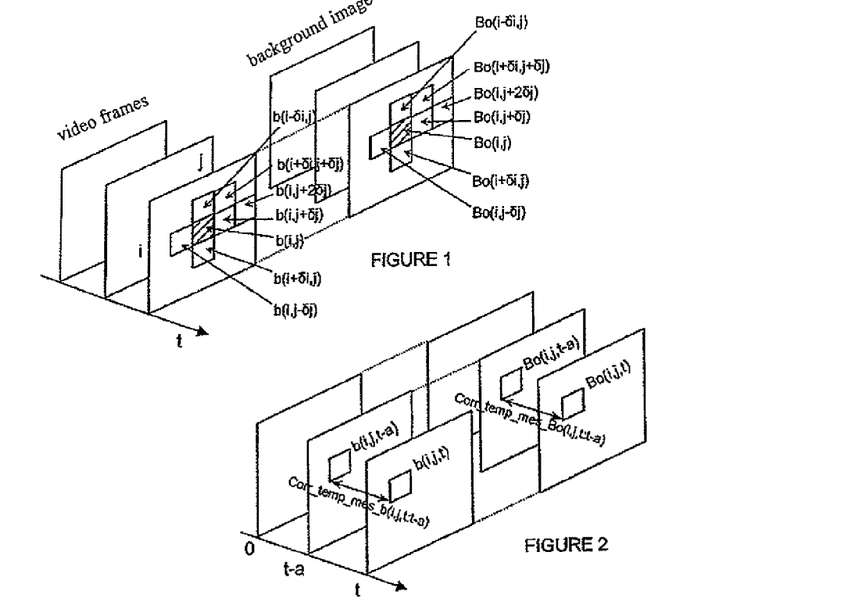
FIG. 1 illustrates the cutting into blocks of each video frame and the cutting into corresponding blocks of the background image.
FIG. 2 illustrates the time correlation between identical blocks at different times.

Each unit image of the video stream corresponding to a frame emitted at a time t, is cut into regular blocks b(i, j, t) of at least one pixel (FIG. 1). Similarly, the background image is cut into corresponding regular blocks Bo(i, j, t), i.e. one block Bo (i, j) of the background image has the same coordinates as a block b (i, j) of the frame image.

In one embodiment, each image is divided into N blocks. For example, N=40.

The size of a block preferably depends on the image resolution and/or the size of the moving objects in the foreground.

From the blocks, refer to FIG. 2, the time correlation Corr_temp_mes_b(i, j, t:t−a) between a given block b(i, j, t) of an image at a time (t) and the same block b(i, j, t−a) of one image or several images at another time (t−a), and/or the time correlation Corr_temp_mes_Bo(i, j, t:t−a) between a given block Bo(i, j, t) of a background image at a time (t) and the same block Bo(i, j, t−a) of one image or several background images at another time (t−a).

According to the invention, the time (t−a) can be before (a>0) or after (a<0) time t. Two consecutive or not consecutive frames can be selected, so that, if two consecutive frames are separated by δt, the inter-frame gap, then |a| is a multiple of δt.

Preferably, the time correlation between the block b(i, j, t) and the same block b(i, j, t−a) is determined between two consecutive frames, which shortens the computation times. Then, a=δt.

This measure of time correlation is also called the measure of stationarity, of block b(i, j, t) or block Bo(i, j, t). The results of this measure are saved in a memory. This measure Corr_temp_mes_b(i, j, t:t−a), Corr_temp_mes_Bo(i, j, t:t−a) is made and used as described hereinunder.

Preferably, the method according to the invention further comprises a step consisting in calculating the sum of the measures of stationarity for all the blocks b(i, j, t) of one frame at a time t. This sum Corr_temp_mes_b(ΣI, Σj, t:t−a) for a given frame is then compared to a first threshold T1. If the sum is under the threshold T1, then the frame is not taken into account. As a matter of fact, too high a level of stationarity corresponding to too low measures of stationarity may interfere with the computations according to the invention.

Similarly, the method according to the invention may further comprise a step consisting in comparing the sum Corr_temp_mes_b(ΣI, Σj, t:t−a) for a given frame at a second threshold T2. If the sum is above the second threshold T2, then the frame is not taken into account, either. As a matter of fact, too low a level of stationarity corresponding to too high measures of stationarity may mean that the number and/or the mobility of the objects in the foreground is too high and interferes with the computations.

Preferably, the respective value of the thresholds T1 and T2, depends on the size of the image, i.e. the number of pixels in the image, or even on the size of the blocks.

The initial background image of the scene, also called the static image, is saved in a memory. The initial background image may be one of the unit images, for example the first one or the one showing the least motions, or else a background image built from exclusively time correlation measures, as described hereabove.

At any time t, we simultaneously have a frame cut into blocks b(i, j, t) and a corresponding background image cut into blocks Bo(i, j, t), the values of which are a minimum equal to those of the blocks Bo(i, j, t−δt) of the background image at the previous time t−δt. The background image is thus updated on the fly and available at any time.

The background image is then possibly updated at a time t as a function of the respective values of the blocks Bo(i, j) and b(i, j) at a time t or at another time t−a, as described hereinafter.

According to the invention, the method further comprises a step consisting in determining the space correlation between blocks close and preferably adjacent to one another. For example, when the shape of the blocks is square or rectangular, two adjacent blocks have a side and/or an angle in common (i.e. a diagonal in common). And more generally, two blocks including K×K pixels are close if the baric centres of said blocks are spaced at most by K pixels, more particularly if both blocks have an adjacent side, or K times the square root of two, if the blocks have an angle in common.

Then, as described hereinafter, the space correlation can be determined:

between a given block b(i, j, t) of a frame at a time (t) and at least another block b(i+δi, j+δj, t) of the same frame; and/or between a given block b(i, j, t) of a frame at a time (t) and at least a block Bo(i+δi, j+δj, t)—preferably other than block Bo(i, j, t)—of the corresponding background image; and/or between a given block Bo(i, j, t) of the background image at a time (t) and at least another block Bo(i+δi, j+δj, t) of the background image.

Figure 3:
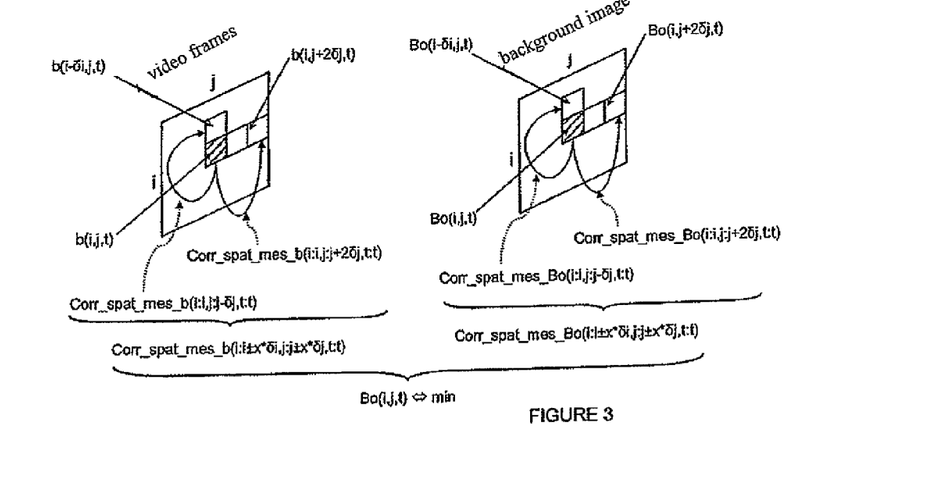
FIG. 3 illustrates one embodiment of the method according to the invention.

For this purpose, in one embodiment, the sum of the space correlations Corr_spat_mes_b(i:i±x*δi, j:j±y*δj, t:t) between a given block b(i, j, t) of one image at a time (t) and at least one preferably adjacent block, b(i±x*δi, j±y*δj, t), of the same frame is calculated, refer to FIG. 3.

In order to simply illustrate FIG. 3, only the space correlation Corr_spat_mes_b(i:i, j:j+2δj, t:t) between the block b(i, j, t) and the block b(i, j+2δj, t) and the space correlation Corr_spat_mes_b(i:i, j:j−δj, t:t) between the block b(i, j, t) and the block b(i−δi, j, t) have been represented.

Similarly, as also illustrated in FIG. 3, according to the invention, the sum of the space correlations Corr_spat_mes_Bo(i:i±x*δi, j:j±y*δj, t−a:t−a) between the block Bo(i, j, t−a) of the background image at a time (t) corresponding to said given block b(i, j, t) of the image at a time t, and at least a close and preferably adjacent block Bo(i±x*δi, j±y*δj, t−a) of the background image at the same time (t), possibly with a=0.

Preferably, the respective value of x and y is low, so as to keep the notion of proximity. For example, x=y=2.

In order to give a simple illustration of FIG. 3, the space correlation Corr_spat_mes_Bo(i:i, j:j+2δj, t−a:t−a) between the block Bo(i, j, t−a) and the block Bo(i, j+2δj, t−a) and the space correlation Corr_spat_mes_b(i:i, j:j−δj, t−a:t−a) between the block Bo(i, j, t−a) and the block Bo(i−δi, j, t−a) only have been represented, possibly with a=0.

Then, the value of the block Bo(i, j, t) is updated by selecting among the blocks b(i, j, t) and Bo(i, j, t) the one the coordinates of which have the minimum value of the two following sums:

$$Bo(i,j,t) \Leftrightarrow \min[\text{Corr\_spat\_mes}\_b(i:i\pm x^*\delta i, j:j\pm y^* \delta j, t:t); \text{Corr\_spat\_mes}\_Bo(i:i\pm x^*\delta i, j:j\pm y^* \delta j, t-a:t-a)].$$

In another embodiment, the space correlation between a block of the frame and at least a corresponding block adjacent to the background image can be calculated.

Figure 4:
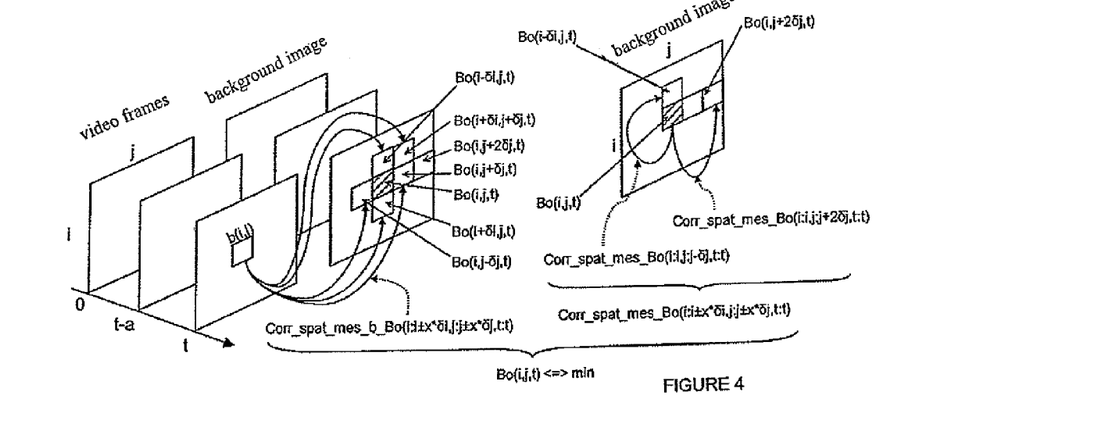
FIG. 4 illustrates one embodiment of the method according to the invention, FIG. 4' illustrates one embodiment of the method according to the invention, FIG. 4" illustrates one embodiment of the method according to the invention, FIG. 4''' illustrates one embodiment of the method according to the invention.

For this purpose, the sum of the space correlations Corr_spat_mes_b_Bo(i:i±x*δi, j:j±y*δj, t:t) between a given block b(i, j, t) of an image at a time (t) and at least a block Bo(i±x*δi, j±y*δj, t) of the background image, preferably another one than the block Bo(i, j, t) close to, and preferably adjacent to said block Bo(i, j, t) at the same time (t) is calculated, refer to FIG. 4.

As also illustrated in FIG. 4, the sum of the space correlations Corr_spat_mes_Bo(i:i+x*δi, j:j±y*δj, t:t) between the block Bo(i, j, t) of the background image at a time (t) corresponding to said given block b(i, j, t) of the image at a time t, and at least a block, close to and preferably adjacent to Bo(i±x*δi, j±y*δj, t) of the background image at the same time (t) is also measured.

In order to simply illustrate FIG. 4, the space correlation Corr_spat_mes_Bo(i:i, j:j+2δj, t:t) between the block Bo(i, j, t) and the block Bo(i, j+2δj, t) and the space correlation Corr_spat_mes_Bo(i:i, j:j−δj, t:t) between the block Bo(i, j, t) and the block Bo(i−δi, j, t) only have been represented.

The value of the block Bo(i, j, t) is then updated by selecting among the blocks b(i, j, t) and Bo(i, j, t), the one, the coordinates of which have the minimum value of these two sums:

$$Bo(i,j,t) <=> \min[\text{Corr\_spat\_mes}\_b\_Bo(i:i\pm x^*\delta i, j:j\pm y^*\delta j, t:t); \text{Corr\_spat\_mes}\_Bo(i:i\pm x^*\delta i, j:j\pm y^*\delta j, t:t)].$$

Similarly, in another embodiment illustrated in FIG. 4', the sum of the space correlations Corr_spat_mes_b_Bo(i:i±x*δi, j:j±y*δj, t:t) between a given block b(i, j, t) of an image at a time (t) and at least one block Bo(i±x*δi, j±y*δj, t) of the background image, preferably other than the block Bo(i, j, t), close to, and preferably adjacent to said block Bo(i, j, t) at the same time t is calculated.

As also illustrated in FIG. 4', the sum of the space correlations Corr_spat_mes_b(i:i+x*δi, j:j±y*δj, t:t) between the block b(i, j, t) of the frame image at a time (t), and at least one block, close to, and preferably adjacent to said block, b(i±x*δi, j±y*δj, t) of the frame image at the same time (t) is also measured.

In order to simply illustrate FIG. 4', only the space correlation Corr_spat_mes_b(i:i, j:j+2δj, t:t) between the block b(i, j, t) and the block b(i, j+2δj, t), and the space correlation Corr_spat_mes_b(i:i, j:j−δj, t:t) between the block b(i, j, t) and the b(i−δi, j, t) have been represented.

The value of the block Bo(i, j, t) is then updated by selecting among the blocks b(i, j, t) and Bo(i, j, t), i.e. the one the coordinates of which have the minimum value of these two sums:

$$Bo(i,j,t) <=> \min[\text{Corr\_spat\_mes}\_b\_Bo(i:i\pm x^*\delta i, j:j\pm y^*\delta j, t:t); \text{Corr\_spat\_mes}\_b(i:i\pm x^*\delta i, j:j\pm y^*\delta j, t:t)].$$

Similarly in another embodiment illustrated in FIG. 4", the sum of the space correlations Corr_spat_mes_Bo_b(i:i±x*δi, j:j±y*δj, t:t) between a given block Bo(i, j, t) of the background image at a time (t) and at least one block b(i±x*δi, j±y*δj, t) of the image of the video frame at the same time t, preferably another one than the block b(i, j, t), close to, and preferably adjacent to said block b(i, j, t) is calculated.

As also illustrated in FIG. 4'', the sum of the space correlations Corr_spat_mes_b(i:i±x*δi, j:j±y*δj, t:t) between the block b(i, j, t) of the frame image at a time (t), and at least one block, close to, and preferably adjacent to said block b(i±x*δi, j±y*δj, t) of the frame image at the same time (t) is also measured.

In order to simply illustrate FIG. 4'', the space correlation only, Corr_spat_mes_b(i:i, j:j+2δj, t:t) between the block b(i, j, t) and the block b(i,j+2δj,t), and the space correlation Corr_spat_mes_b(i:i, j:j−δj, t:t) between the block b(i, j, t) and the block b(i−δi, j, t) have been represented.

The value of the block Bo(i, j, t) is then updated by selecting among the blocks b(i, j, t) and Bo(i, j, t), the one, the coordinates of which have the minimum value of these two sums.

$$Bo(i,j,t) <=> \min[\text{Corr\_spat\_mes\_Bo\_b}(i:i\pm x^*\delta i, j:j\pm y^*\delta j,t:t); \text{Corr\_spat\_mes\_b}(i:i\pm x^*\delta i,j:j\pm y^*\delta j,t:t)].$$

Similarly, in another embodiment illustrated in FIG. 4''', the sum of the space correlations Corr_spat_mes_Bo_b (i:i±x*δi,j: j±y*δj, t:t) between a given block Bo(i, j, t) of the background image at a time (t) and at least one block b(i±x*δi,j±y*δj,t) of the video frame image at the same time t, preferably other than the block b(i, j, t), close to, and preferably adjacent to said block b(i, j, t) is calculated.

As also illustrated in FIG. 4''', the sum of the space correlations Corr_spat_mes_Bo(i:i±x*δi, j:j±y*δj, t:t) between the block Bo(i, j, t) of the frame image at a time (t), and at least one block, close to, and preferably adjacent to Bo(i±x*δi, j±y*δj, t) of the background image at the same time (t) is also measured.

In order to simply illustrate FIG. 4''', only the space correlation Corr_spat_mes_Bo(i:i, j:j+2δj, t:t) between the block Bo(i, j, t) and the block Bo(i, j+2δj, t), and the space correlation Corr_spat_mes_Bo(i:i, j:j−δj, t:t) between the block Bo(i, j, t) and the block Bo(i−δi, j, t) have been represented.

The value of the block Bo(i, j, t) is then updated by selecting among the blocks b(i, j, t) and Bo(i, j, t), the one, the coordinates of which have the minimum value of such two sums:

$$Bo(i,j,t) <=> \min[\text{Corr\_spat\_mes\_Bo\_b}(i:i\pm x^*\delta i, j:j\pm y^*\delta j,t:t); \text{Corr\_spat\_mes\_Bo}(i:i\pm x^*\delta i,j:j\pm y^*\delta j, t:t)].$$

Figure 5:
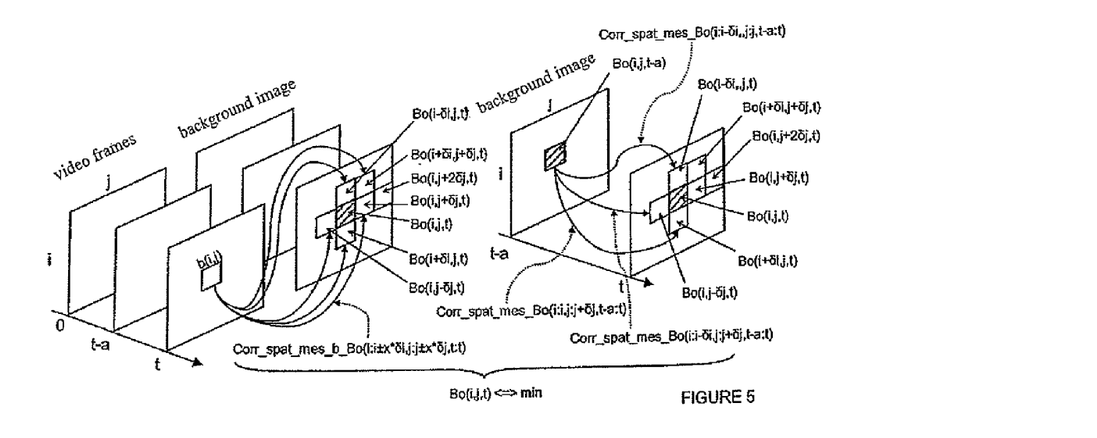
FIG. 5 illustrates one embodiment of the method according to the invention, FIG. 5' illustrates one embodiment of the method according to the invention.

According to the invention, the measure of the space correlation—illustrated in any one of FIGS. 4 to 4'''—can further be coupled to a measure of a time correlation, as regards the frames and/or the background image, refer to FIG. 5.

In one embodiment, the sum of the space correlations Corr_spat_mes_b_Bo(i:i±x*δi, j:j±y*δj, t:t) between a given block b(i, j, t) of one image at a time (t) and at least one block Bo(i±x*δi, j±y*δj, t) of the background image at a time t, preferably other than the block Bo(i, j, t), close to, and preferably adjacent to said block Bo(i, j, t), is calculated in the same way as the one illustrated in FIG. 4.

As also illustrated in FIG. 5, the sum of the space correlations Corr_spat_mes_Bo(i:i±x*δi, j:j±y*δj, t−a:t) between the block Bo(i, j, t−a) of the background image at time (t−a) corresponding to said given block b(i, j, t−a) of the image at time (t−a), and at least a block Bo(i±x*δi, j±y*δj, t) of the background image at a time t, close to, and preferably adjacent to the block Bo(i, j, t) is also calculated.

In order to simply illustrate the right part of FIG. 5, only the space correlation Corr_spat_mes_Bo(i:i, j:j+δj, t−a:t) between the block Bo(i, j, t−a) and the block Bo(i, j+δj, t), the space correlation Corr_spat_mes_Bo(i:i−δi, j:j+δj, t−a:t) between the block Bo(i, j, t−a) and the block Bo(i−δi, j+δj, t), and the space correlation Corr_spat_mes_Bo(i:i−δi, j:j, t−a:t) between the block Bo(i, j, t−a) and the block Bo(i−δi, j, t) have been represented.

The value of the block Bo(i, j, t) is then updated by selecting the block corresponding to the minimum value of such sums:

$$Bo(i,j,t) <=> \min[\text{Corr\_spat\_mes\_b\_Bo}(i:i\pm x^*\delta i,j: j\pm y^*\delta j,t:t); \text{Corr\_spat\_mes\_Bo}(i:i,j:j+\delta j,t-a:t);$$

$$\text{Corr\_spat\_mes\_Bo}(i:i-\delta i,j:j+\delta j,t-a:t);$$

$$\text{Corr\_spat\_mes\_Bo}(i:i-\delta i,j:j,t-a:t)].$$

As illustrated in FIG. 5', the sum of the space correlations Corr_spat_mes_Bo(i:i±x*δi, j:j±y*δj, t:t−a) between the block Bo(i, j, t) of the background image at a time (t) corresponding to said given block b(i, j, t) of the image at a time (t), and at least one block Bo(i±x*δi, j±y*δj, t−a) of the background image at time (t−a), close to and preferably adjacent to the block Bo(i, j, t) can be calculated.

In order to simply illustrate the right part of FIG. 5', some space correlations only, Corr_spat_mes_Bo(i:i±x*δi, j:j±y*δj, t:t−a) between the block Bo(i, j, t−a) and the block Bo(i, j+δj, t), have been represented.

Then the value of the block Bo(i, j, t) is updated by selecting the block corresponding to the minimum value of these sums.

In other non illustrated embodiments, the sum of the space correlations Corr_spat_mes_b(i:i±x*δi, j:j±y*δj, t:t−a) between the block b(i, j, t) of the image of the video frame at a time (t), and at least a block b(i±x*δi, j±y*δj, t−a) of the background image at time (t−a), close to and, preferably adjacent to, the block b(i, j, t) can be calculated. The sum of the space correlations Corr_spat_mes_b(i:i±x*δi, j:j±y*δj, t−a:t) between the block b(i, j, t−a) of the image of the video frame at time (t−a), and at least a block b(i:i±x*δi, j:j±y*δj, t) of the image of the video frame at a time (t), close to and preferably adjacent to the block b(i, j, t) can also be calculated.

Whatever the embodiment, two consecutive frames are preferably selected, so that a=δt.

Space correlations can be calculated by measuring the sum of the absolute differences (SAD) between the block b(i, j) or Bo(i, j) considered and the close block(s) selected in the same frame, the same frame at another time, on the same background image or the background image at another time.

For example, between a block b(i, j, t) and a set of blocks b(i±x*δi, j±y*δj, t) with $\{x, y\} \in \{1; 2; \ldots; \Delta\}^2$, the following can be set, according to specific directions (i.e. right, left, bottom, top respectively):

$$\text{droite\_SAD}\Delta[b(i,j,t)] = \text{SAD}[b(i,j,t),b(i-1,j,t)] + \ldots + \text{SAD}[b(i,j,t),b(i-\Delta,j,t)]$$

$$\text{gauche\_SAD}\Delta[b(i,j,t)] = \text{SAD}[b(i,j,t),b(i+1,j,t)] + \ldots + \text{SAD}[b(i,j,t),b(i+\Delta,j,t)]$$

$$\text{bas\_SAD}\Delta[b(i,j,t)] = \text{SAD}[b(i,j,t),b(i,j-1,t)] + \ldots + \text{SAD}[b(i,j,t),b(i,j-\Delta,t)]$$

$$\text{haut\_SAD}\Delta[b(i,j,t)] = \text{SAD}[b(i,j,t),b(i,j+1,t)] + \ldots + \text{SAD}[b(i,j,t),b(i,j+\Delta,t)]$$

The minimum value of such sums SAD is kept as the measure of the space correlation Corr_spat_mes_b(i:i±x*δi, j:j±y*δj, t:t) between a given block b(i, j, t) of an image at a time (t) and at least a preferably adjacent block b(i±x*δi, j±y*δj, t) of the same frame.

The same principle is implemented to calculate the space correlation Corr_spat_mes_Bo(i:i±x*δi, j:j±y*δj, t:t) between the block Bo(i, j, t) of the background image at a time (t) and at least a block Bo(i±x*δi, j±y*δj, t) of the background image at the same time (t), and, to calculate the space correlation Corr_spat_mes_Bo (i:i±x*δi, j:j±y*δj, t−a:t) between the block Bo(i, j, t−a) of the background image at time (t−a) and at least a block Bo(i±x*δi, j±y*εj, t) of the background image at a time (t), close to, and preferably adjacent to the block Bo(i, j, t).

or else, to calculate the space correlation Corr_spat_mes_b_Bo(i:i±x*δi, j:j±y*δj, t:t) between a given block b(i, j, t) of one image at a time (t) and at least a block Bo(i±x*δi, j±y*δj, t) of the background image at a time t, preferably another one than the block Bo(i, j, t), close to, and preferably adjacent to the block Bo(i, j, t).

The generic function of the space correlation calculation is thus named Corr_spat_mes.

In one embodiment, the space correlation sum1 coupled to a time correlation measure is first measured on at least two frames.

For this purpose, the time correlation Corr_temp_mes_b(i, j, t) is measured—as described hereabove—between a given block b(i, j, t) of an image at a time (t) and the same block b(i, j, t−a) of an image at another time (t−a), refer to FIG. 5.

For calculating sum1, the weight of the space correlation can also be weighted by a parameter λ, which may depend on time λ(t), so that Sum1=Corr_temp_mes_b(i,j,t)+λ(t)·Corr_spat_mes_b_Bo(i:i±x*δi,j:j±y*δj,t:t)

For example λ is equal to δi, which is equal to δj, i.e. λ=2.

Similarly, the space correlation coupled to a time correlation measure sum2 is measured on at least two background images.

For this purpose, the time correlation Corr_temp_mes_Bo (i, j, t) is measured—as described hereabove—between a given block Bo(i, j, t) of the background image at a time (t) and the same block Bo(i, j, t−a) of the background image at another time (t−a).

The space correlation Corr_spat_mes_Bo(i:i±x*δi, j:j±y*δj, t−a:t) is also measured between the block Bo(i, j, t−a) of the background image at time (t−a) corresponding to said given block b(i, j, t) of the image at a time (t), and at least an adjacent block Bo(i±δi, j±δj, t) of the background image at a time (t).

For calculating sum2, the weight of the space correlation can also be weighted by a parameter λ, which may depend on time λ(t), so that Sum2=Corr_temp_mes_Bo(i,t)+λ(t)·Corr_spat_mes_Bo(i:i±x*δi,j:j±y*δj,t−a:t)

The value of the block Bo(i, j, t) is then updated by selecting the minimum value of these two values:

Bo(i,j,t)=min[sum1;sum2]

The block Bo(i, j, t) of the background image can thus be either the block Bo(i, j, t−a), or the block b(i, j, t).

Measuring the time or space correlation is carried out, for example, by measuring the difference in the values of the luminance of the pixel(s) of the blocks considered. Preferably, it is further executed by measuring the difference in the values of the chrominance of the pixel(s) of the blocks considered.

In one embodiment, the time or space correlation is determined by measuring the sum of the absolute differences (SAD) between the block b(i, j, t) and the same block b(i, j, t±z*δt) on a plurality of frames, and by selecting the block, the absolute sum of which is the smallest of all.

In order to simplify calculations, two consecutive frames t and t−1 are preferably selected, so that a=δt (z=1).

According to the invention, the background image is updated on the fly. A block Bo(i, j) of the background image used for the space correlation computations may thus already have been updated during a previous iteration. Advantageously, each frame of blocks b(i, j) is scanned in a first direction and in a second direction, i.e. a first series of correlation computations is carried out starting from the first block b(1, 1) at the top left of the frame to the last block b(N, M) at the bottom right of the frame; then a second series of correlation computations is carried out starting from the last block b(N, M) at the bottom right of the frame to the first block b(1, 1) at the top left of the frame.

Similarly, a dichotomized implementation can be provided for, so that each frame of blocks b(i, j) is iteratively scanned with a gradient of block size, possibly each time in a first direction, then in a second direction.

For example, with an iteration I=2, the first scan is performed with a size of blocks b(i, j) equal to N1*M1; and the second scan is performed with a size of blocks b(i, j) equal to N2*M2, so that N2<N1 and M2<M1.

Preferably, the second scan with the second size of the blocks is implemented only on the blocks b(i, j) identified during the first scan, the space and/or time correlation of which is above a threshold.

In addition, as the background image is updated on the fly, the latter can be displayed for the user, for example in a pre-view mode. In one embodiment, the user can stop, whenever he/she wants, the implementation of the method as a function of the displayed background image.

According to the invention, a step of calculating the speed of convergence of the background image can also be provided for. The calculated speed is compared to a threshold and the scan of the blocks Bo(i, j) of the background image is stopped if the speed is under the threshold. The speed of convergence can be calculated for example by counting the number of blocks Bo(i, j) updated relatively to the total number of blocks b(i, j) of the frame image, equal to the total number of blocks Bo(i, j) of the background image.

According to the invention, a step of checking the stationarity can also be provided for. For this purpose, if the stationarity of a block Bo(i, j), of the background image or a block Bo(i, j) of a frame is above a threshold, then an adjacent block Bo(i+δi, j+δj) is substituted for the block Bo(i, j).

The invention claimed is:

1. A method of regenerating the background of a digital image of a video stream produced by a fixed camera and including a plurality of time-sequential frames, with each one including a respective unit image, the method comprising:
setting an initial background image in a memory;
cutting the unit images of the video stream into blocks b(i, j, t) of at least one pixel;
cutting the background image into corresponding blocks Bo(i, j, t) having the same size and the same coordinates (i, j) as those of the unit images;
selecting at least one block b(i, j, t), b(i, j, t−a), Bo(i, j, t−a), and Bo(i, j, t); and
calculating the space correlation thereof, wherein the space correlation comprises calculating 1) the space correlation (Corr_spat_mes_b, Corr_spat_mes_b_Bo) between a given block b(i, j, t) of the frame image, at a time (t), and
1a) at least one block Bo(i±x*δi, j±y*δj, t) of the background image close to said block Bo(i, j, t), at a time (t), or
1b) at least one block Bo(i±x*δi, j±y*δj, t−a) of the background image close to said block Bo(i, j, t−a), at another time (t−a), or
2) the space correlation (Corr_spat_mes_Bo, Corr_spat_mes_Bo_b) between a given block Bo(i, j, t) of the background image, at a time (t), and
2a) at least one block Bo(i±x*δi, j±y*δj, t) of the background image close to said block Bo(i, j, t), at a time (t), or
2b) at least one block Bo(i±x*δi, j±y*δj, t−a) of the background image close to said block Bo(i, j, t−a), at another time (t−a), or
2c) at least one block b(i±x*δi, j±y*δj, t) of the frame image close to said block b(i, j, t), at a time (t),
where (i±δi, j±δj) are the coordinates of a block adjacent to a block having the coordinates (i, j) and x and y are integers; and
calculating the time correlation (Corr_temp_mes_b) between a given block b(i, j, t) of an image at a time (t) and the same block b(i, j, t−a) of an image or of several images at a preceding time (t−a); or
calculating the time correlation (Corr_temp_mes_Bo) between a given block Bo(i, j, t) of an image at a time (t) and the same block Bo(i, j, t−a) of an image or of several images at a preceding time (t−a); and
updating the background image according to the space correlation and the time correlation;
wherein the space correlation coupled to a measure of the time correlation is measured (sum1) on at least two frames, where the weight of the space correlation is weighted by a parameter λ depending on time λ(t), so that Sum1=Corr_temp_mes_b(i,j,t)+λ(t)*Corr_spat_mes_b_Bo(i:i±x*δi,j:j±y*δj,t:t);

wherein the space correlation coupled to a measure of the time correlation is measured (sum2) on at least two frames, where the weight of the space correlation is weighted by a parameter λ depending on time λ(t), so that Sum2=Corr_temp_mes_Bo(i,j,t)+λ(t)*Corr_spat_mes_Bo(i:i±x*δi,j:j±y*δj,t−a:t); and wherein the value of the block Bo(i, j, t) is updated by selecting the minimum value of both values (Sum1, Sum2);
in which
δ represents a change,
Corr_spat_mes_b_Bo (i:i±x*δi, j:j±y*δj, t:t) is the sum of the space correlations between block b(i,j,t) at a time (t) and at least one block Bo(i±x*δi, j±δj,t) of the background image at the same time (t),
Corr_spat_mes_Bo (i:i±x*δi, j:j±y*δj, t−a:t) is the sum of the space correlation between block Bo(i, j, t−a) of the background image at a time (t−a) and at least a block Bo(i±x*δi, j±δj, t) of the background image at a time (t), with $\{x,y\} \in \{1; 2; \ldots; \Delta\}^2$.

2. The method of claim 1, wherein the updating of the background image further comprises substituting the block b(i,j,t), b(i,j,t−a), Bo(i,j,t−a) or Bo(i,j,t) for the block Bo(i, j, t) by selecting among these the one having the minimum space correlation.

3. The method of claim 1, wherein the space correlation is calculated by measuring the sum of the absolute differences (SAD) between the blocks considered.

4. The method of claim 3, wherein the space correlation between a given block (b(i, j, t), Bo(i, j, t)) and a set of blocks (b(i±x*δi, j±y*δj, t), Bo(i±x*δi, j±y*δj, t)), with $\{x, y\} \in \{1; 2; \ldots; \Delta\}^2$ is set along specific directions, with the minimum value of the sums of the absolute differences (SAD) along each one of these specific directions being retained as a measure of the space correlation.

5. The method of claim 1, wherein each frame of blocks b(i, j) or background image of blocks (Bo(i, j) is scanned at least in a first and in a second direction, so that a first series of correlation computations is performed in the first direction; and a second series of correlation computations is performed in the second direction.

6. The method of claim 1, wherein the size of the blocks b(i, j) or Bo(i, j) in the first direction is different from that of the blocks b(i, j) or Bo(i, j) in the second direction.

7. The method of claim 1, further comprising:
computing the sum of measures of stationarity for the set of the blocks b(i, j, t) of a frame at a time (t);
comparing the sum of the measures of stationarity with a first threshold (T1), and
if the sum is under the first threshold (T1), then taking the frame into account for the space correlation computations.

8. The method of claim 7, further comprising:
comparing the sum of the measures of stationarity with a second threshold (T2); and
if the sum is above the second threshold (T2), then not taking the frame into account for the space correlation computations.

9. The method of claim 1, further comprising:
calculating the speed of convergence of the background image;
comparing the calculated speed with a threshold; and
stopping the scanning of the blocks Bo(i, j) of the background image if the speed is under the threshold.

10. The method of claim 1, wherein the space correlation consists in further computing the space correlation (Corr_spat_mes_b, Corr_spat_mes_b_Bo) between a given block b(i, j, t) of the frame image at a time (t) and at least one block b(i±x*δi, j±y*δj, t) of the frame image close to said block b(i, j, t), at a time (t).

11. A system comprising a processor and a machine-readable media including program code instructions operative to cause the processor to execute the steps of the method of claim 1.

* * * * *